United States Patent
Loewen et al.

(10) Patent No.: US 9,251,920 B2
(45) Date of Patent: Feb. 2, 2016

(54) IN-SITU AND EXTERNAL NUCLEAR REACTOR SEVERE ACCIDENT TEMPERATURE AND WATER LEVEL PROBES

(75) Inventors: Eric P. Loewen, Wilmington, NC (US); Brian S. Triplett, Wilmington, NC (US); Brett J. Dooies, Wilmington, NC (US)

(73) Assignee: GE-HITACHI NUCLEAR ENERGY AMERICA LLC, Wilmington, NC (US)

( * ) Notice: Subject to any disclaimer, the term of this patent is extended or adjusted under 35 U.S.C. 154(b) by 541 days.

(21) Appl. No.: 13/444,535

(22) Filed: Apr. 11, 2012

(65) Prior Publication Data

US 2013/0272468 A1    Oct. 17, 2013

(51) Int. Cl.
| | |
|---|---|
| *G21C 17/112* | (2006.01) |
| *G21C 17/00* | (2006.01) |
| *G21D 1/00* | (2006.01) |
| *G21D 3/00* | (2006.01) |
| *G21C 17/10* | (2006.01) |

(52) U.S. Cl.
CPC ........ *G21C 17/00* (2013.01); *G21D 1/00* (2013.01); *G21D 3/001* (2013.01); *G21C 17/10* (2013.01); *Y02E 30/40* (2013.01)

(58) Field of Classification Search
None
See application file for complete search history.

(56) References Cited

U.S. PATENT DOCUMENTS

| | | | |
|---|---|---|---|
| 4,079,236 A * | 3/1978 | Graham et al. | ............... 376/255 |
| 4,298,430 A | 11/1981 | Rolstad et al. | |
| 4,421,716 A | 12/1983 | Hench et al. | |
| 4,495,142 A | 1/1985 | Nakayama et al. | |
| 4,521,373 A * | 6/1985 | Terhune et al. | ............... 376/258 |

(Continued)

FOREIGN PATENT DOCUMENTS

| | | |
|---|---|---|
| GB | 2018421 A | 10/1979 |
| JP | 524989 A | 1/1977 |

(Continued)

OTHER PUBLICATIONS

"NUREG-1150: Severe Accident Risks: An Assessment for Five U.S. Nuclear Power Plants", Final Summary Report, Division of Systems Research, Office of Nuclear Regulatory Research, U.S. Nuclear Regulatory Commission, Washington, DC, Dec. 1990.

(Continued)

*Primary Examiner* — Jack W Keith
*Assistant Examiner* — Sean P Burke
(74) *Attorney, Agent, or Firm* — Harness, Dickey & Pierce, P.L.C.

(57) ABSTRACT

A system for monitoring a state of a reactor core in a nuclear reactor may include an internal monitoring device located inside the reactor core, the internal monitoring device including one or more internal sensor arrays configured to take measurements of conditions of the reactor core at different vertical regions within the reactor core to generate internal measurement data; an external monitoring device located in the reactor structure outside the reactor core, the external monitoring device including one or more external sensor arrays configured to take measurements of conditions of the reactor core at positions outside the reactor core corresponding the plurality of different vertical regions within the reactor core to generate external measurement data, and a transmitter configured to wirelessly transmit the external measurement data; and a receiver station configured to determine a state of the reactor core based on the external and internal measurement data.

18 Claims, 4 Drawing Sheets

(56) References Cited

U.S. PATENT DOCUMENTS

| | | | |
|---|---|---|---|
| 4,774,050 A * | 9/1988 | Impink, Jr. | 376/245 |
| 4,990,855 A * | 2/1991 | Niedrach et al. | 324/449 |
| 5,309,485 A | 5/1994 | Chao | |
| 5,490,184 A * | 2/1996 | Heibel | 376/254 |
| 5,519,740 A * | 5/1996 | Chao | 376/216 |
| 5,652,775 A | 7/1997 | Grosmaire | |
| 6,236,698 B1 | 5/2001 | Hirukawa et al. | |
| 6,252,923 B1 * | 6/2001 | Iacovino et al. | 376/272 |
| 6,958,693 B2 | 10/2005 | Rothgeb et al. | |
| 8,503,599 B2 | 8/2013 | Koste et al. | |
| 2001/0026603 A1 * | 10/2001 | Hirukawa et al. | 376/255 |
| 2003/0204371 A1 * | 10/2003 | Sciamanna | 702/183 |
| 2003/0227394 A1 * | 12/2003 | Rothgeb et al. | 340/870.01 |
| 2004/0149918 A1 * | 8/2004 | Craig et al. | 250/370.01 |
| 2007/0201601 A1 * | 8/2007 | Oda et al. | 376/259 |
| 2009/0032178 A1 | 2/2009 | Feinroth | |
| 2009/0154633 A1 * | 6/2009 | Fawks, Jr. | 376/254 |
| 2010/0104060 A1 * | 4/2010 | Koste et al. | 376/247 |
| 2013/0170596 A1 * | 7/2013 | Ginsberg et al. | 376/247 |

FOREIGN PATENT DOCUMENTS

| | | |
|---|---|---|
| JP | 5430882 A | 3/1979 |
| JP | 54158591 A | 12/1979 |
| JP | S59-65220 A | 4/1984 |
| JP | 61114381 U | 7/1986 |
| JP | S62-245996 A | 10/1987 |
| JP | H03-108651 A | 5/1991 |
| JP | H06-82592 A | 3/1994 |
| JP | H10-504384 A | 4/1998 |
| JP | 10123282 A | 5/1998 |
| JP | H11-264887 A | 9/1999 |
| JP | 2005-526332 A | 9/2005 |
| JP | 2007163208 A | 6/2007 |
| JP | 2010-107498 A | 5/2010 |

OTHER PUBLICATIONS

Hodge, S.A. et al., "NUREG/CR-5869: Identification and Assessment of BWR In-Vessel Severe Accident Mitigation Strategies", Oak Ridge National Laboratory, Oak Ridge, TN, Prepared for Division of Systems Research, Office of Nuclear Regulatory Research, U.S. Nuclear Regulatory Commission, Washington, DC, Oct. 1992.

Unofficial English Translation of Japanese Office Action issued in connection with corresponding JP Application No. 2013-080049 on Jan. 27, 2015.

Office Action for corresponding Japanese application No. 2013-080049 dated Oct. 6, 2015.

* cited by examiner

IN-SITU AND EXTERNAL NUCLEAR REACTOR SEVERE ACCIDENT TEMPERATURE AND WATER LEVEL PROBES

BACKGROUND

1. Field

This disclosure relates generally to monitoring conditions in and around nuclear reactors during normal and off-normal operating conditions.

2. Description of Related Art

During a severe accident a nuclear reactor, for example a boiling water reactor (BWR), may experience significant fuel damage. The fuel damage may occur as a result of a loss of coolant accident (LOCA). The damage sustained by the reactor may impede attempts to monitor environmental conditions in and around the reactor even after water is applied to cool the reactor. Presently, methods for determining conditions in and around reactors which have experienced an accident include the use of robots. It is important to receive information regarding the state of a reactor even after a severe accident has occurred.

SUMMARY

According to at least one example embodiment, a system for monitoring a state of a reactor core included in a nuclear reactor may include an internal monitoring device located inside the reactor core, the internal monitoring device including one or more internal sensor arrays each configured to take measurements of conditions of the reactor core at each of a plurality of different vertical regions within the reactor core to generate internal measurement data, the internal monitoring device being configured to provide the internal measurement data to one or more data signal lines of the nuclear reactor; an external monitoring device located in the reactor structure outside the reactor core, the external monitoring device including one or more external sensor arrays each configured to take measurements of conditions of the reactor core at positions outside the reactor core corresponding to each of the plurality of different vertical regions within the reactor core to generate external measurement data, and a transmitter configured to wirelessly transmit the external measurement data outside the nuclear reactor; and a receiver station configured to receive the external measurement data and the internal measurement data, and to determine a state of the reactor core based on the received external and internal measurement data.

According to at least one example embodiment, the one or more internal sensor arrays are each configured to take measurements of at least one of a temperature and a conductivity of the reactor core.

According to at least one example embodiment the internal monitoring device further includes a first case made from a rigid material having a melting point higher than that of stainless steel.

According to at least one example embodiment, the first case is made of at least one of tungsten, molybdenum, niobium and silicon carbide.

According to at least one example embodiment, the one or more internal sensor arrays includes a temperature sensor array including a plurality of temperature sensors each corresponding to one of the plurality of different vertical positions within the reactor core.

According to at least one example embodiment, the one or more internal sensor arrays includes a conductivity sensor array including a plurality of conductivity sensors, each of the plurality of conductivity sensors extending to an outer surface of the first case, each of the plurality of conductivity sensors corresponding to one of the plurality of different vertical regions within the reactor core, and the first case includes a plurality of protrusions extending outwards above each of the plurality of conductivity sensors.

According to at least one example embodiment, the internal monitoring device is located inside a traversing in-core probe (TIP) tube of the reactor core.

According to at least one example embodiment, the internal monitoring device further includes a first data processor configured to generate the internal measurement data by digitizing the measurements taken by the one or more internal sensor arrays.

According to at least one example embodiment, the internal monitoring device includes a power line configured to receive power from a source external to the internal monitoring device.

According to at least one example embodiment, at least one of the one or more external sensor arrays is configured to take measurements of at least one of a gamma flux and a neutron flux of the reactor core.

According to at least one example embodiment, the external monitoring device further includes a second case made of at least one of stainless steel, tungsten, molybdenum, niobium and, silicon carbide.

According to at least one example embodiment, the one or more external sensor arrays includes a sensing unit array including a plurality of sensing units, each of the plurality of sensing units being configured to measure at least one of a gamma flux and a neutron flux, each of the plurality of sensing units corresponding to one of the plurality of different vertical regions within the reactor core.

According to at least one example embodiment, the external monitoring device further includes a power unit configured to power the external monitoring device independently of any external power source.

According to at least one example embodiment, the external monitoring device further includes a coupling unit configured to affix the external monitoring device to a surface inside the nuclear reactor, the coupling unit including at least one of a magnet, an adhesive, and a bolting mechanism.

According to at least one example embodiment, the external monitoring device further includes a controller configured to control an operation mode of the external monitoring device to be one of an active mode and a stand-by mode based on the external measurement data. The external monitoring device is configured to operate such that less power is used in the stand-by mode than in the active mode.

According to at least one example embodiment, the receiver station includes a data processing unit configured to determine conditions in the reactor core including at least one of cladding oxidation, water level, cladding melting, core redistribution, nuclear reactivity $k_{eff}$ and temperature, based on at least one of the external measurement data and the internal measurement data.

According to at least one example embodiment, a device for monitoring a reactor core or a nuclear reactor may include a case made from a rigid material having a melting point higher than that of stainless steel, the first case being configured to fit inside an internal tube of the reactor core; one or more sensor arrays, at least one of the one or more sensory arrays being configured to take measurements of at least one of a temperature and a conductivity of the reactor core at each of a plurality of different vertical regions within the reactor core to generate internal measurement data; and one or more internal signal lines configured to transfer the internal measurement data to signal lines of the nuclear reactor.

According to at least one example embodiment, the case is made of at least one of tungsten, molybdenum, niobium and silicon carbide.

According to at least one example embodiment, the case is configured to fit inside a traversing in-core probe (TIP) tube of the reactor core.

According to at least one example embodiment, the one or more internal sensor arrays includes a conductivity sensor array including a plurality of conductivity sensors, each of the plurality of conductivity sensors extending to an outer surface of the first case, each of the plurality of conductivity sensors corresponding to one of the plurality of different vertical regions within the reactor core, and the first case includes a plurality of protrusions extending outwards above each of the plurality of conductivity sensors.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
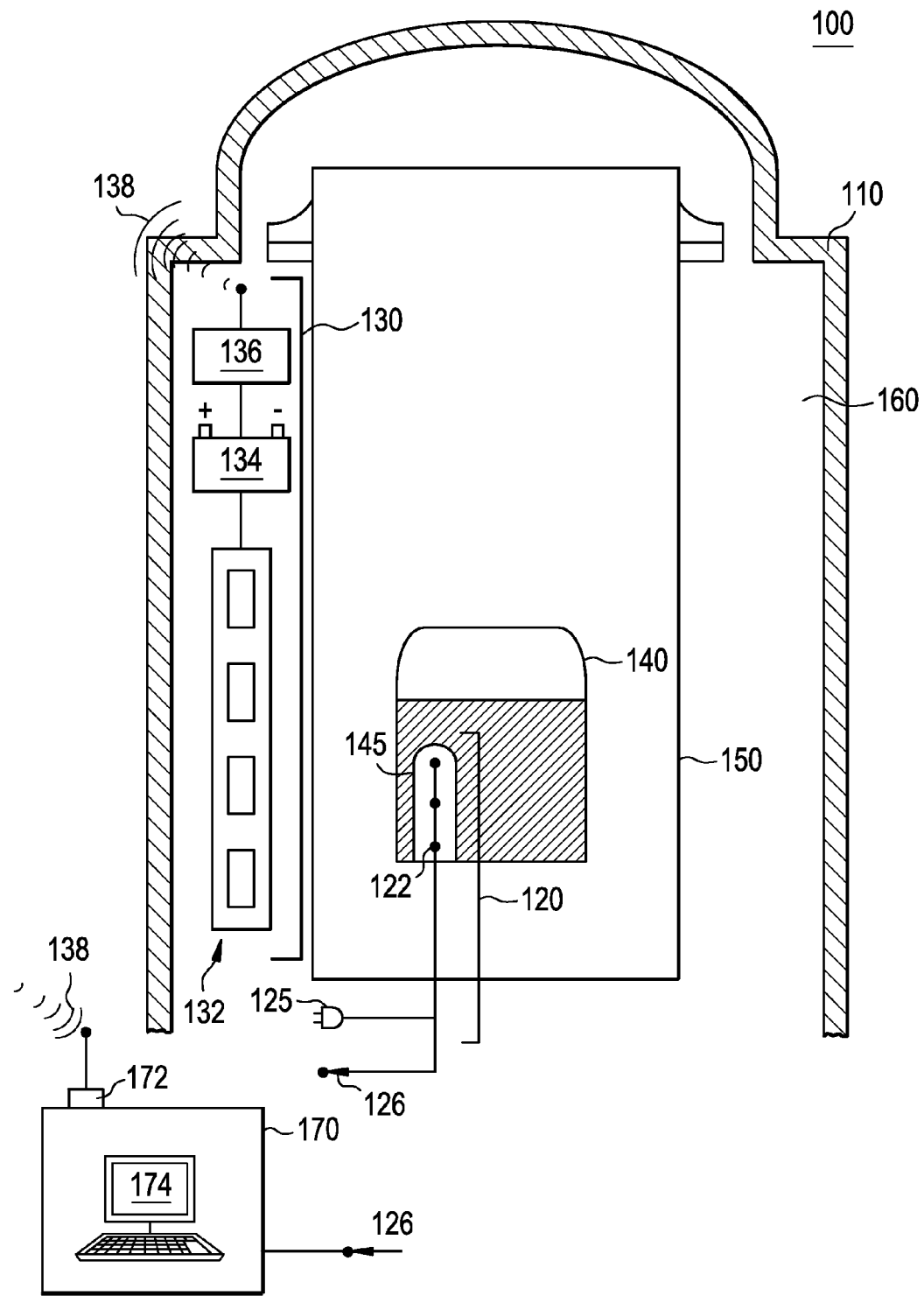
FIG. 1 illustrates a reactor system according to at least one example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 illustrates a reactor system 100. Reactor system 100 is located in, for example, a nuclear plant. Reactor system 100 includes a reactor structure 110 and a receiver station 170.

The reactor structure includes a rector core 140, a reactor vessel 150 and a dry well 160. Located at least partially inside the reactor core 140 is an internal monitoring device 120. The internal monitoring device 120 includes internal sensors 122 for monitoring a state of the reactor core 140. The internal sensors 122 may be located, for example, inside an instrumentation tube 145 of the reactor core 140, and may extend in a line down the length of the reactor core 140. The internal sensor 120 may be connected via power line 125 to an external power source. The internal monitoring device 120 may output sensed measurements via data line 126. The internal monitoring unit 120 will be discussed in greater detail with reference to FIG. 2.

Located outside the reactor core 140 is an external monitoring device 130. The external monitoring device 130 includes external sensor array 132 for monitoring a state of the reactor core 140. The external sensor array 132 may be located in an array outside the reactor core 140 which extends along a line corresponding to a length of the reactor core 140. The external monitoring device further includes a power unit 134 to provide power to the external monitoring device 130, and a transmission unit 136 for wirelessly transmitting measurements sensed by the external monitoring device 130. The external monitoring device 130 may be located, for example, on the reactor vessel 150 or in another position within the drywell 160. The external monitoring unit 130 will be discussed in greater detail with reference to FIG. 3.

In the example embodiment illustrated in FIG. 1, only one internal monitoring device 120 and one external monitoring device 130 are illustrated. Though, for the purpose of simplicity, only one internal monitoring device 120 and one external monitoring device 130 are illustrated, according to at least one example embodiment, any number of internal monitoring devices 120 may be located in the reactor core 140 and any number of external monitoring devices 130 may be located in the reactor structure 110 outside the reactor core 140. The reactor structure 110 will be discussed in greater detail below with reference to FIG. 2.

The internal monitoring device 120 is configured to generate reactor state measurements by measuring conditions inside the reactor core 140. For example, the internal monitoring device may measure water levels and/or temperature inside the reactor core 140. The external monitoring device 130 is configured to generate reactor state measurements by measuring conditions inside the reactor core 140 from outside the reactor core 140. For example, the external monitoring device 130 may measure neutron flux or gamma flux at positions outside the rector core 140. Because both the internal monitoring device 120 and the external monitoring device 130 extend in a direction corresponding to a length of the reactor core 140, the internal monitoring device 120 and the external monitoring device 130 may generate measurements representing the state of the reactor core 140 at each of a plurality of different positions located at different heights within the reactor core 140.

The internal monitoring device 120 and the external monitoring device 130 are each configured to transmit data representing the measured state of the reactor core 140 to the receiver station 170 where a plant operator can review the environmental and/or movement measurements. For example, according to at least one example embodiment, the internal monitoring device 120 and the external monitoring device 130 may form reactor state data by digitizing the generated reactor state measurements. The internal monitoring device 120 may send the digitized reactor state data to the receiving station 170 via data lines 126. The external monitoring device 130 may broadcast the digitized reactor state data, using, for example, low-frequency radio waves 138, for reception at one or more locations outside the reactor structure including, for example, the receiving station 170.

Further, the internal monitoring device 120 and the external monitoring device 130 are each structured to operate during normal and off-normal operating conditions. As used herein, normal operating conditions refer to operating conditions during which none of the reactor state measurements generated by the internal monitoring device 120 and the external monitoring device 130 are outside a threshold range determined according to the preference of a plant operator. As used herein, off-normal operating conditions refer to conditions in which any of the reactor state measurements generated by the internal monitoring device 120 and the external monitoring device 130 are outside a threshold range determined according to the preference of a plant operator. Off-normal operating conditions may be associated with any of a number of plant transients ranging from less severe events, including elevated reactor pressure or temperature, to very severe events including, for example, a loss of coolant accident (LOCA).

The internal monitoring device 120 and the external monitoring device 130 are each configured to resist the extreme amounts of heat, radiation and/or physical force associated with severe off-normal operating conditions including, for example, conditions during a LOCA. Accordingly, the internal monitoring device 120 and the external monitoring device 130 are each configured to generate and transmit data representing the environmental conditions in the reactor structure 110 even during or after a reactor accident. The structure and operation of the internal monitoring device 120 and the external monitoring device 130 will be discussed in greater detail below with reference to FIGS. 2 and 3.

Returning to FIG. 1, the receiver station 170 includes a reception device 172 configured to receive the wirelessly transmitted environmental data from the external monitoring device 130. The reception device may be, for example, any device capable of receiving low-frequency radio transmissions. According to at least one example embodiment, the receiver station 170 may include data display/processing device 174 where a plant operator can view and manipulate data received from any of the one or more monitoring devices included in the reactor structure 110.

The data display/processing device 174 may include a data processor and a memory storing instructions that, when executed by the processor, cause the display/processing device to implement a measurement data interpretation application. The measurement data interpretation application is capable of receiving measurement data from the internal monitoring device 120 and the external monitoring device 130, applying one or more functions to the received measurements data, and determining conditions inside the reactor core 140 based on outputs of the one or more functions. For example, based on the measurement data and the one or more functions the measurement data interpretation application may generate outputs representing different conditions within the reactor core 140 including, for example, cladding oxidation, water level, cladding melting, core redistribution, nuclear reactivity $k_{eff}$ and temperature. The measurement data interpretation application will be discussed in greater detail below with reference to FIG. 4. The data display/processing device 174 may be, for example, a personal computer or a terminal including a monitor and a keyboard. Though, for the purpose of simplicity, only one receiving station is illustrated in FIG. 1, the reactor system 100 may include any number of receiving stations each located, for example, at positions outside the reactor structure 110, and each capable of receiving environmental data broadcasted by the external monitoring device 130 and transmitted by internal monitoring device 120.

Consequently, using the reactor system 100 according to at least one example embodiment, operators at locations outside the reactor structure 110, including for example the receiving station 170, can receive valuable information regarding a state of the reactor core 140 with respect to multiple regions of the reactor core 140 located at different heights, even during or after a reactor accident including, for example, a LOCA.

The structure and operation of the internal monitoring device 120 will now be discussed in greater detail below with reference to FIG. 2.

Figure 2:
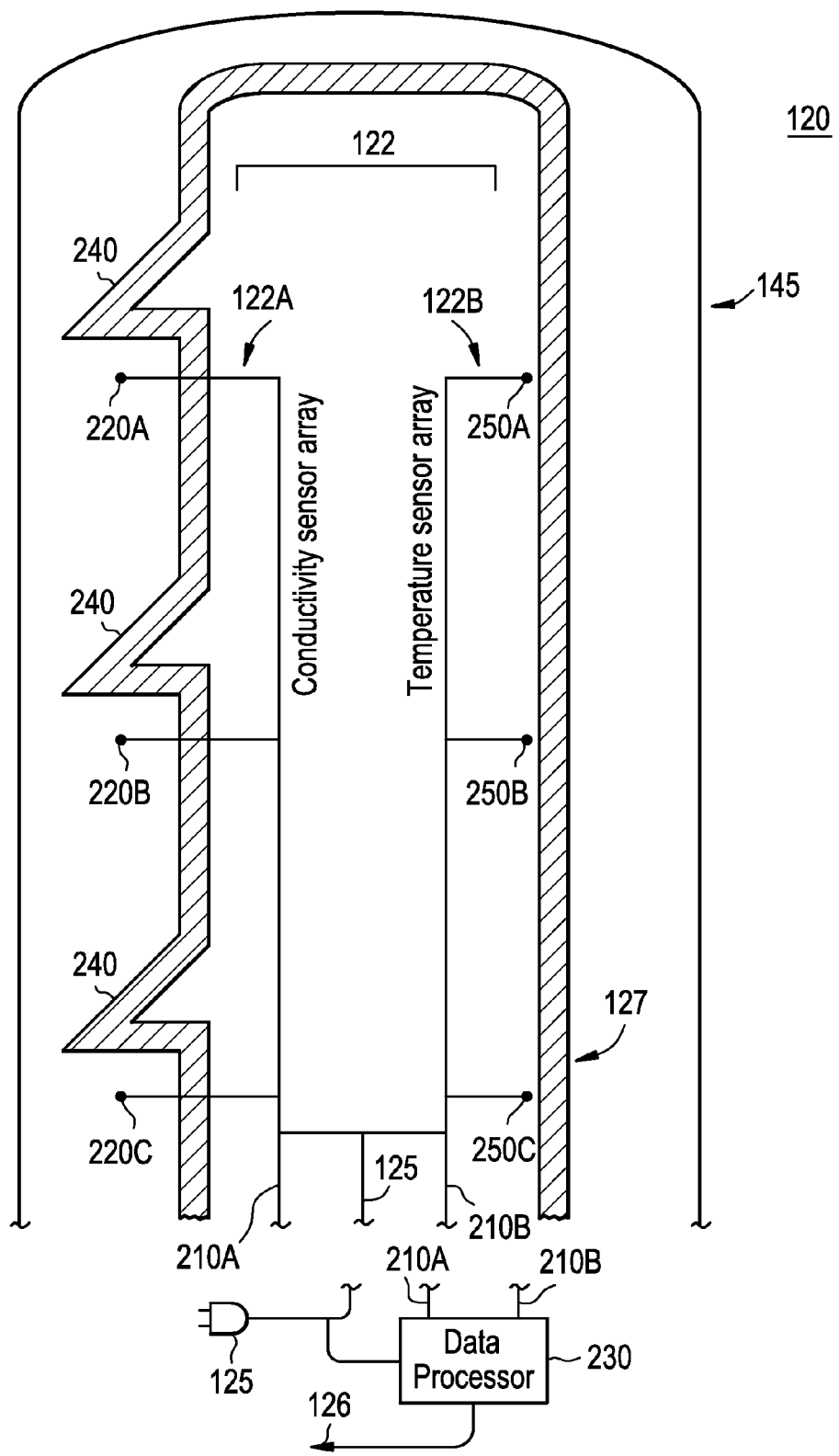
FIG. 2 illustrates a more detailed example of the internal monitoring device illustrated in FIG. 1 according to at least one example embodiment.

FIG. 2 is a diagram illustrating the internal monitoring device 120 in greater detail according to example embodiments. Referring to FIG. 2, the internal monitoring device 120 may include the internal sensors 122, the power line 125, the data line 126, a first case 127, and a first data processor 230. The internal sensors 122 may include sensors for sensing any type of environmental conditions within the reactor core 140 according to a preference of a plant operator. For example, the sensors 122 may include a conductivity sensor array 122A and a temperature sensor array 122B. The conductivity sensor array 122A may include first through third conductivity sensors 220A-220C located at different heights corresponding to regions of the reactor core 140 at different heights. The temperature sensor array 122B may include first through third temperature sensors 250A-250C located at different heights corresponding to regions of the reactor core 140 at different heights.

Though for the purpose of simplicity, the conductivity sensor array 122A is illustrated as including only three conductivity sensors 220A-C, according to example embodiments, the conductivity sensor array 122A may include any number of conductivity sensors arranged vertically, for example, to extend a distance equal to a height of the reactor core 140. Further, though for the purpose of simplicity, the temperature sensor array 122B is illustrated as including only three temperature sensors 250A-C, according to example embodiments, the temperature sensor array 122B may include any number of temperature sensors arranged vertically, for example, to extend a distance equal to a height of the reactor core 140.

As is explained above with reference to FIG. 1, the internal monitoring device 120 may be located within the instrumentation tube 145 of the reactor core 140. The instrumentation tube may be, for example, a stainless steel tube which is either empty or includes unused space. The instrumentation tube may be, for example, a tube that was originally used for instrumentation that was later removed from the reactor core 140. Though the original instrumentation was removed, the instrumentation tube 145 remains. Accordingly, the internal sensor 120 can be installed in the reactor core 140 without the need to form new penetrations or cavities in the reactor core 140. The instrumentation tube 145 may be, for example, a traversing in-core probe (TIP) tube made from, for example, stainless steel.

The first case 127 may be formed of a rigid material having a melting point substantially higher than that of the instrumentation tube 145 and capable of resisting deformation while experiencing extreme physical force. For example, the first case 127 may be formed of a rigid material having a melting point substantially higher stainless steel including, for example, tungsten, molybdenum, niobium or a ceramic including, for example, silicon carbide.

According to at least one example embodiment, the first case 127 holds and, at least partially, encloses the internal sensors 122, the power line 125, and the data line 126. For example, the first through third conductivity sensors 220A-C of the conductivity sensor array 122A may each be located on an outer surface of the first case 127. During a severe accident, the material of the instrumentation tube 145, for example stainless steel, may melt. The melting stainless steel may coat the first through third conductivity sensors 220A-C. This metal coating may prevent the first though third conductivity sensors from operating properly. Accordingly, the first case 127 may include protrusions 240 which extend outward above locations at which the first though third conductivity sensors 220A-C are positioned in order to prevent melting portions of the instrumentation tube 145 from coating the first through third conductivity sensors 220A-C.

The first though third conductivity sensors 220A-C may each generate conductivity measurements which may be used to infer or determine a water level inside the reactor core 140. The first through third conductivity sensors 220A-C may be any known type of conductivity sensor. Resistance is the inverse of conductivity. Accordingly, for example, if the conductivity sensors are fully submerged in water the measured electrical resistance may be negligible. However if the conductivity probes are placed in a nonconductive environment such as nitrogen or steam, the measured resistance may approach infinity indicating a zero water level. The normal operation of one of the first through third conductivity sensors 220A-C is to have a high resistance reading indicating zero water levels in the instrumentation tube 145. During severe off-normal conditions, the water level in the instrumentation tube 145 may not be zero. The first through third conductivity sensors 220A-C may output conductivity measurements via the conductivity sensor line 210A.

The first though third temperature sensors 250A-C may be any known type of temperature sensor. For example, the first through third sensors 250A-C may be an array of B-type thermocouples each being rated for a temperature of 1700° C. As is discussed above, the first through third temperature sensors 250A-C are each arranged at a different height within the reactor core 140. Accordingly, based on temperature readings taken from multiple vertical positions within the reactor core 140, a state of the reactor core 140 may be determined with greater precision. The first through third temperature sensors 250A-C may output temperature measurements via the temperature sensor line 210B.

The first data processor 230 may receive conductivity measurements from the conductivity sensor array 122A via conductivity sensor line 210A. The data processor 230 may also receive temperature measurements from the temperature sensor array 122B via temperature sensor line 210B.

The first data processor 230 processes measurements received from the internal sensors 122 and outputs processed measurement data via the data line 126. For example, the data processor 230 may process the conductivity and temperature measurements received from the internal sensors 122 and output processed measurement data via the data line 126 to one or more external locations including, for example, the receiving station 170. The processing performed by the data processor 230 may include, for example, analog-to-digital conversion. According to at least one example embodiment, the data processor 230 includes hardware and/or software capable of performing analog-to-digital conversion. For example, the data processor 230 may include an analog-to-digital function which converts measurements received from the internal sensors 122, which may be received in analog form, to digital form. The analog-to-digital function may also organize the generated digital data according to the type of measurement the data is associated with such that the different types of digital data (e.g., conductivity, temperature, etc) are represented in a uniform and organized manner. According to at least one example embodiment, the data line 126 through which the first data processor 230 outputs processed measurement data may be an existing data line for conventional instrumentation already present in the reactor core 140. Thus, it may not be necessary to run new data lines throughout the reactor structure 110 for the internal monitoring unit 120.

The internal sensors 122 and the data processor 230 of the internal monitoring unit 120 may each be coupled to, and receive power from, the power line 125. According to at least one example embodiments, the power line 125 may be an existing power line for conventional instrumentation already present in the reactor core 140. Thus, it may not be necessary to run new power lines throughout the reactor structure 110 for the internal monitoring unit 120.

The operations and functional processes discussed above with respect to the conductivity sensor array 122A and the temperature sensor array 122B of the internal sensors 122, and the first data processor 230 may be implemented using hardware including, for example, one or more digital signal processors (DSPs), application-specific-integrated-circuits, field programmable gate arrays (FPGAs) or the like.

Figure 3:
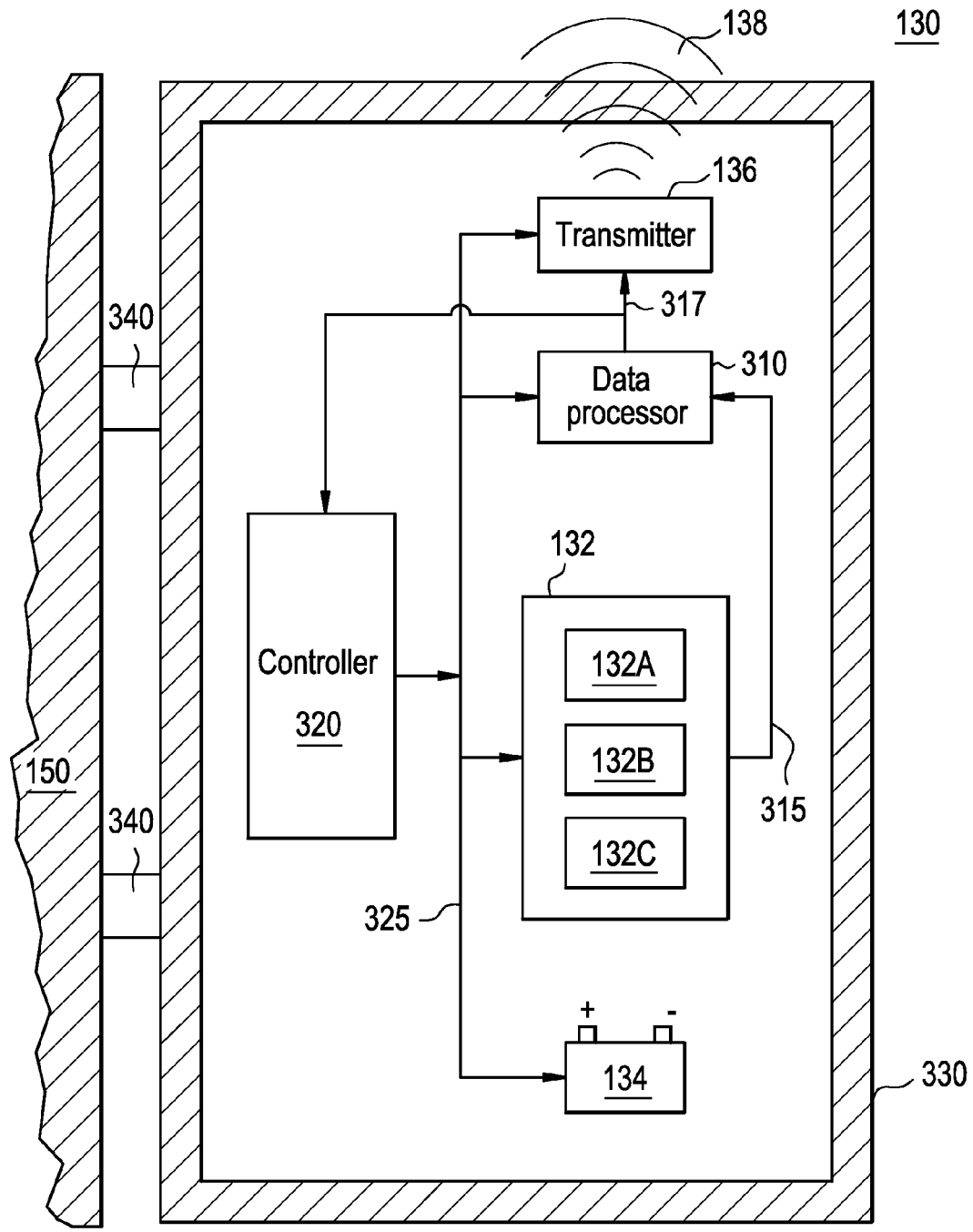
FIG. 3 illustrates a more detailed example of the external monitoring device illustrated in FIG. 1 according to at least one example embodiment.

FIG. 3 is a diagram illustrating the external monitoring device 130 in greater detail according to example embodiments.

Referring to FIG. 3, the first monitoring device 130 may include the external sensor array 132, the power unit 134, the transmitter 136, a second data processor 310, a controller 320, a second case 330, and a coupling unit 340.

According to at least one example embodiment, the second case 330 encloses and holds the external sensor array 132, the power unit 134, the transmitter 136, the second data processor 310, and the controller 320. Like the first case 127, the second case 330 may be formed of any rigid material that has a relatively high melting point and is capable of resisting deformation while experiencing extreme physical force. For example, the second case 330 may be formed of stainless steel, tungsten, molybdenum, niobium or a ceramic including, for example, silicon carbide.

The coupling unit 340 affixes the second case 330 to a surface of a reactor structure 110 being monitored by the external monitoring device 130. For example, in the example illustrated in FIG. 3, the external monitoring device 330 is affixed to the reactor vessel 150 through the coupling unit 340. The coupling unit 340 may be any device capable of forming a stable connection between the case 330 and the surface to which the external monitoring device 130 is being attached. For example, the coupling unit 340 may include at least one of magnets, adhesives and bolts.

The external sensor array 132 may include an array of sensing units including first through third sensing units 132A-C. Though for the purpose of simplicity, the external sensor array 132 is illustrated in FIG. 3 and discussed as including only three sensing unit 132A-C, according to example embodiments, the external sensor array 132 may include any number of sensing units arranged vertically, for example, to extend a distance equal to a height of the reactor core 140. The first through third sensing units 132A-C may be configured to sense any type of environmental conditions which may allow a plant operator to infer a state of the reactor core 140, according to a preference of the plant operator. For example, the first through third sensing units 132A-C may include hardware and/or software capable of measuring neutron flux and/or gamma flux. The neutron flux and/or gamma flux sensor hardware may include collimators to narrow the sensors' measurement capabilities to a particular axial location of the reactor core 140.

As is illustrated in FIG. 3, the external sensor array 132 is connected to a second data processor 310. According to at least one example embodiment, the external sensor array 132 may send environmental measurements 315 to the second data processor 310.

Like the first data processor 230 illustrated in FIG. 2, the second data processor 310 processes received measurements and outputs processed measurement data 317. For example, the second data processor 310 may process the environmental measurements 315 received from the external sensor array 132. Like the first data processor 230 discussed above with reference to FIG. 2, the processing performed by the second data processor 310 may include, for example, analog-to-digital conversion. However, the processing performed by the second data processor 310 may also include encryption. According to at least one example embodiment, the second data processor 310 includes hardware and/or software capable of performing analog-to-digital conversion. For example, the second data processor 310 may include an analog-to-digital function which converts the environmental measurements 315, which may be received from the external sensor array 132 in analog form, to digital form. Like the first data processor 230, the analog-to-digital function of the second data processor 310 may also organize the generated digital data according to the type of measurement the data is associated with such that the different types of digital data (e.g., neutron flux, gamma flux, etc.) are represented in a uniform and organized manner. Further, according to at least one example embodiment, the second data processor 310 may also include hardware and/or software capable of performing data encryption. For example, the second data processor 310 may include an encryption function which encrypts the digital measurement data generated by the analog-to-digital conversion function. According to at least one example embodiment, the measurement data may be encrypted to help ensure that only intended recipients are able to read the measurement data. Intended recipients include, for example, the receiving station 170 illustrated in FIG. 1. The analog-to-digital conversion and encryption functions performed by the second data processor 310 may be performed according to any known methods for analog-to-digital conversion and encryption, respectively. The second data processor 310 outputs the processed environmental measurements to the transmitter 136 in the form of the measurement data 317. According to at least one example embodiment, the second data processor 310 may also output the measurement data 317 to the controller 320.

The transmitter 136 transmits the measurement data 317 outward from the external monitoring device 130 wirelessly. The transmitter 136 may transmit the measurement data 317 using radio signals 138. For example, the transmitter 136 may transmit the measurement data 317 using, as the radio signals 138, low frequency (LF) or ultra low frequency (ULF) radio signals ranging from 300 Hz to 300 kHz. The transmitter 136 may include, for example, any known device capable of transmitting data using low frequency radio waves. Low frequency radio waves may be any radio waves low enough to penetrate the infrastructure of a reactor structure to which the external monitoring device 130 is affixed.

The power unit 134 provides any power necessary for the operation of the external sensor array 132, the second data processor 310, the transmitter 136, and the controller 320. According to at least one example embodiment, the power unit 134 is capable of operating independently from any power source external to the external monitoring device 130. For example, the power unit 134 may include one or more batteries and/or fuel cells.

According to at least one example embodiment, in order to prolong the lifespan of the power unit 134, one or more elements within the external monitoring device 130 are capable of operating in at least two operation modes: standby and active. The operation modes may be controlled by, for example, the controller 320.

The controller 320 includes hardware and/or software for generating control signals 325 to control an operation mode of one or more of the external sensor arrays 132, the data processor 310, the transmitter 136 and power unit 134. The operation modes include at least a standby mode for operation during normal operating conditions, and an active mode for operation during off-normal operating conditions. The controller 320 is capable of selecting an operation mode based on whether or not the reactor structure to which the external monitoring device 130 is affixed is experiencing off-normal conditions including, for example, a LOCA. For example, the controller 320 may receive environmental measurement data 317 from the second data processor 310, and determine whether or not off-normal conditions exist based on the measurement data 317. The controller 320 may then set the operating condition to standby if normal operating conditions exit, and set the operation mode to active if off-normal operating conditions exit. The controller 320 may determine whether or not off-normal conditions exit by comparing the measurement data 317 to threshold values internally stored in the controller 320. The threshold values may be set according the preference of a plant operator.

In standby mode the controller 320 may control one or more elements within the external monitoring device 130 to operate less often or intermittently in order to conserve power during normal operating conditions. In active mode, the controller 320 may control one or more elements within the external monitoring device 130 to operate more often or continuously. Accordingly, in active mode, the external monitoring device 130 may provide, for example, constant, real-time measurement data to, for example, plant operators at external locations including the receiving station 170 illustrated in FIG. 1 during emergency conditions.

According to at least one example embodiment, in standby mode, the sensing units of the external sensing array 132, including for example first through third sensing units 132A-C, may operate intermittently providing environmental measurements 315, for example, once every 1-5 minutes. Further, the data processor 320 may operate intermittently corresponding to the operation of the sensing array 132. Further, in standby mode, the data processor may provide data only to the controller 320 and not the transmitter 136, and the transmitter 136 may not transmit data at all. Further, in standby mode the power unit 134 may be configured to produce a lower power output in comparison to active mode.

According to at least one example embodiment, in active mode, the sensing units of the external sensing array 132, including for example first through third sensing units 132A-C, may operate continuously generating environmental measurements 315 constantly, and the second data processor 310 may operate continuously, constantly processing the environmental measurements 315 to generate the measurement data 317. Further, in active mode, the second data processor 310 may provide the measurement data 317 to the transmitter 136, and the transmitter 136 may continuously transmit the measurement data using, for example, low frequency radio waves. Further, in active mode the power unit 134 may be configured to produce a higher power output in comparison to the standby mode.

Accordingly, by utilizing the standby and active modes of operation, the first external monitoring device may function for extended periods of time even while using an independent power source. According to at least one example embodiment, the external sensor array 132, the second data processor 310, the transmitter 136, the controller 320, and power unit 134 are configured to provide a standby life span equal to at least 1.5 times the length of a refueling cycle of a reactor being monitored by the external monitoring device 130.

The operations and functional processes discussed above with respect to the sensing units including first through third sensing units 132A-C of the external sensor array 130, the second data processor 310, the transmitter 136, the controller 320, and the power unit 134 may be implemented using hardware including, for example, one or more digital signal processors (DSPs), application-specific-integrated-circuits, field programmable gate arrays (FPGAs) or the like. A method using the measurement data generated by the internal sensor 120 and the external sensor 130 to determine a state of the rector core 140 will now be discussed in greater detail below with reference to FIGS. 4 and 5.

Figure 4:
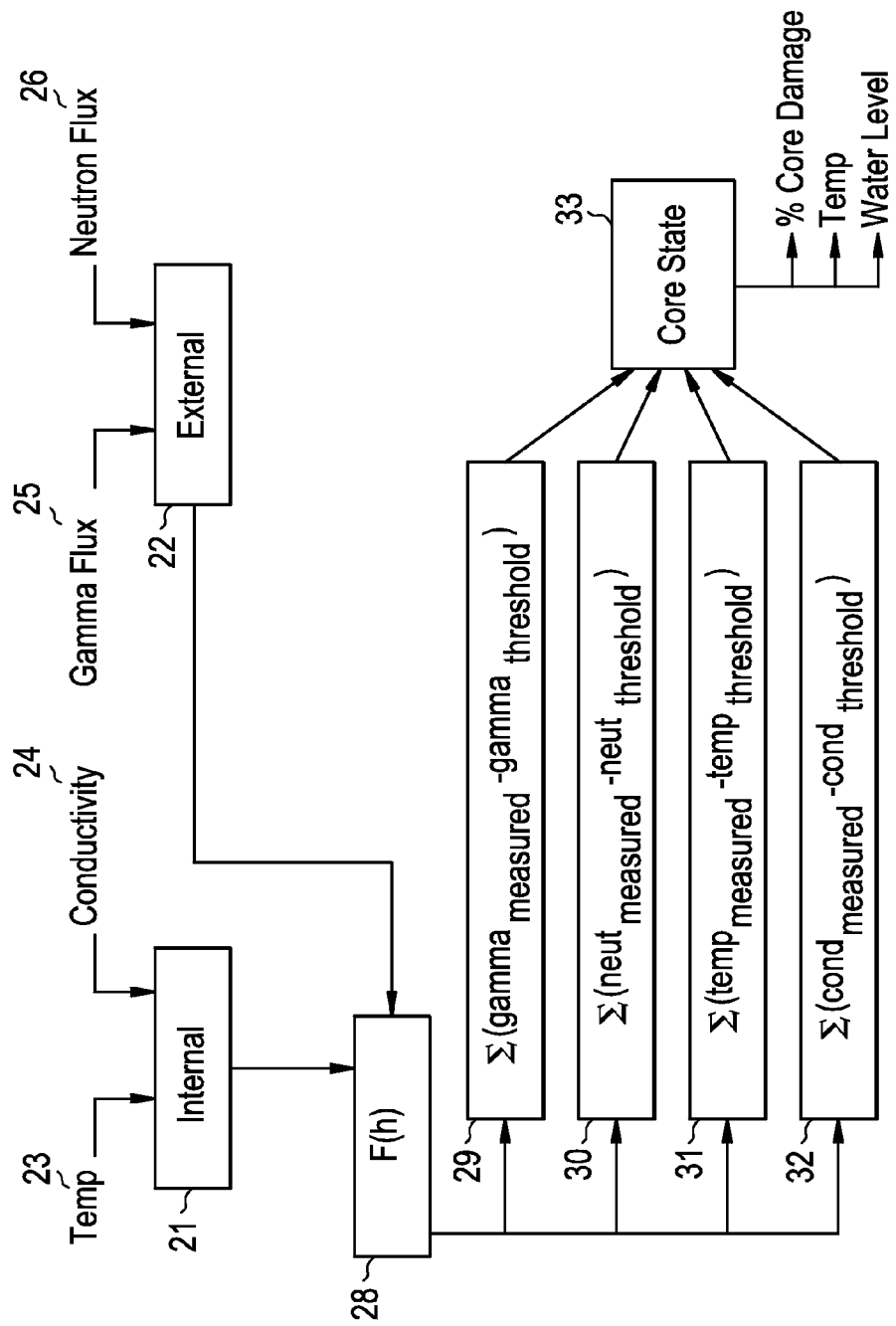
FIG. 4 is a functional diagram illustrating a manner in which measurements data is used to determine a state of a reactor core according to example embodiments.

FIG. 4 is a functional diagram illustrating a manner in which measurements data is used to determine a state of a reactor core according to example embodiments. The operations illustrated in FIG. 4 may be implemented by, for example, the measurement data interpretation application executed by the data display/processing device 174 discussed above with reference to FIG. 1.

Referring to FIG. 4, temperature measurement data 23 and conductivity measurement data 24 generated by the internal sensors 122 and, according to at least one example embodiment, processed by the first data processor 230, may be compiled as an internal measurement data set 21. The internal measurement data set 21 includes temperature measurement data 23 and conductivity measurement data 24 corresponding to each of a plurality of different heights of the reactor core 140 at which the conductivity sensors 220 of the conductivity sensor array 122A and the temperature sensors 250 of the temperature sensor array 122B are positioned.

Gamma flux measurement data 25 and neutron flux measurement data 26 generated by the external sensors 122 an, according to at least one example embodiment, processed by the second data processor 310 may be compiled as an external measurement set 22. Similar to the internal measurement set 21, the external measurement set 22 includes gamma flux measurement data 25 and neutron flux measurement data 26 corresponding to each of a plurality of different heights of the reactor core 140 at which the sensing units of the external sensor array 132 are positioned.

The post-processing function 28 is a function that performs additional operations on the internal measurement data set 21 and the external measurement data set 22. The additional operations may include any data processing functions according to a preference of a plant operator. For example, if any of the temperature measurement data 23, conductivity measurement data 24, gamma flux measurement data 25, and the neutron flux measurement data 26 is encrypted, the post processing function 28 can decrypt the encrypted measurement data according to known methods.

After the measurement data is processed by the post processing function 28, the measurement data is used to determine a core state 33 of the reactor core 140, for example, according to know computational methods. For example, comparison functions may be applied to the measurement data. For example, a gamma flux comparison function 29 may be applied to the gamma flux measurement data 25, a neutron flux comparison function 30 may be applied to the neutron flux measurement data 26, a temperature comparison function 31 may be applied to the temperature measurement data 23, and a conductivity comparison function 32 may be applied to the conductivity measurement data 24.

The gamma flux comparison function 29 may compare each gamma flux measurement $gamma_{measured}$ from the external measurement set 22 to a corresponding gamma flux threshold value $gamma_{threshold}$. The threshold values may be chosen, for example, according to a preference of a plant operator. For example, for each height of the reactor core 140 at which the measurements included in the gamma flux data 25 are taken, there may be a corresponding gamma flux threshold value $gamma_{threshold}$. The gamma flux comparison function 29 may produce, as an output, difference values based on the comparisons of the gamma flux measurements $gamma_{measured}$ and the gamma flux threshold values $gamma_{threshold}$.

Likewise, the neutron flux comparison function 30 may compare each neutron flux measurement $neutron_{measured}$ from the external measurement set 22 to a corresponding neutron flux threshold value $neutron_{threshold}$. The threshold values may be chosen, for example, according to a preference of a plant operator. For example, for each height of the reactor core 140 at which the measurements included in the neutron flux data 26 are taken, there may be a corresponding threshold value $neutron_{threshold}$. The neutron flux comparison function 30 may produce, as an output, difference values based on the comparisons of the neutron flux measurements $neutron_{measured}$ and the neutron flux threshold values $neutron_{threshold}$.

Further, the temperature comparison function 31 may compare each temperature measurement $temp_{measured}$ from the internal measurement set 21 to a corresponding temperature threshold value $temp_{threshold}$. The threshold values may be chosen, for example, according to a preference of a plant operator. For example, for each height of the reactor core 140 at which the measurements included in the temperature data 23 are taken, there may be a corresponding temperature threshold value $temp_{threshold}$. The temperature comparison function 31 may produce, as an output, difference values based on the comparisons of the temperature measurements $temp_{measured}$ and the temperature threshold values $temp_{threshold}$.

Likewise, the conductivity comparison function 32 may compare each conductivity measurement $cond_{measured}$ from the internal measurement set 21 to a corresponding conductivity threshold value $cond_{threshold}$. The threshold values may be chosen, for example, according to a preference of a plant operator. For example, for each height of the reactor core 140 at which the measurements included in the conductivity data 24 are taken, there may be a corresponding conductivity threshold value $cond_{threshold}$. The conductivity comparison function 32 may produce, as an output, difference values based on the comparisons of the temperature measurements $cond_{measured}$ and the temperature threshold values $cond_{threshold}$.

The core state function may interpret the outputs of the gamma flux comparison function 29, the neutron flux comparison function 30, the temperature comparison function 31, and the conductivity comparison function 32 to determine conditions inside the reactor core 140. The determined conditions may include, for example, cladding oxidation, cladding melting, core redistribution, nuclear reactivity $k_{eff}$, a percentage of core damage, a temperature level, and a water level inside the reactor core.

Thus, according to example embodiments, information regarding a state of a reactor core being monitored can be obtained, even during severe off-normal conditions like those associated with a serious reactor accident, by using measurements taken with robustly constructed reactor monitoring devices located at positions inside and outside the monitored reactor core. The reactor core state information will aid a plant operator in detecting, assessing and handling nuclear reactor accidents.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A system for monitoring a state of a reactor core included in a nuclear reactor, the system comprising:
    an internal monitoring device located inside the reactor core, the internal monitoring device including,
        one or more internal sensor arrays each configured to take measurements of conditions at each of a plurality of different vertical regions within the reactor core to generate internal measurement data, the internal monitoring device being configured to provide the internal measurement data to one or more data lines of the nuclear reactor, the one or more internal sensor arrays being configured to take measurements of a conductivity at each of the plurality of different vertical regions, the one or more internal sensor arrays including a conductivity sensor array, the conductivity sensor array including a plurality of conductivity sensors; and
        a first case, at least a portion of the one or more internal sensor arrays being located within the first case, the first case including a plurality of protrusions, the plurality of protrusions extending outwards above each of the plurality of conductivity sensors, and the plurality of protrusions configured to substantially mitigate coating of each of the plurality of conductivity sensors by molten materials;
    an external monitoring device located in the reactor structure outside the reactor core, the external monitoring device including one or more external sensor arrays each configured to take measurements of conditions of the reactor core at positions outside the reactor core corresponding to each of the plurality of different vertical regions within the reactor core to generate external measurement data, and a transmitter configured to wirelessly transmit the external measurement data outside the nuclear reactor; and
    a receiver station configured to receive the external measurement data and the internal measurement data, and to determine a state of the reactor core based on the received external and internal measurement data,
    wherein the one or more internal sensor arrays are further configured to take measurements of a temperature at each of the plurality of different vertical regions.

2. The system of claim 1, wherein the first case is made from a rigid material having a melting point higher than that of stainless steel.

3. The system of claim 2, wherein the first case is made of at least one of tungsten, molybdenum, niobium and silicon carbide.

4. The system of claim 2, wherein the one or more internal sensor arrays includes a temperature sensor array including a plurality of temperature sensors each corresponding to one of the plurality of different vertical positions within the reactor core.

5. The system of claim 2, wherein
    each of the plurality of conductivity sensors extends to an outer surface of the first case, and each of the plurality of conductivity sensors corresponds to one of the plurality of different vertical regions within the reactor core.

6. The system of claim 1, wherein the internal monitoring device is located inside a traversing in-core probe (TIP) tube of the reactor core.

7. The system of claim 1, wherein the internal monitoring device further includes a first data processor configured to generate the internal measurement data by digitizing the measurements taken by the one or more internal sensor arrays.

8. The system of claim 1, wherein the internal monitoring device includes a power line configured to receive power from a source external to the internal monitoring device.

9. The system of claim 1, wherein at least one of the one or more external sensor arrays is configured to take measurements of at least one of a gamma flux and a neutron flux of the reactor core.

10. The system of claim 9, wherein the external monitoring device further includes a second case made of at least one of stainless steel, tungsten, molybdenum, niobium and, silicon carbide, at least a portion of the one or more external sensor arrays being located within the second case so as to be enclosed by the second case.

11. The system of claim 9, wherein the one or more external sensor arrays includes a sensing unit array including a plurality of sensing units, each of the plurality of sensing units being configured to measure at least one of a gamma flux and a neutron flux, each of the plurality of sensing units corresponding to one of the plurality of different vertical regions within the reactor core.

12. The system of claim 9, wherein the external monitoring device further includes a power unit configured to power the external monitoring device independently of any external power source.

13. The system of claim 9, wherein the external monitoring device further includes a coupling unit configured to affix the external monitoring device to a surface inside the nuclear reactor, the coupling unit including at least one of a magnet, an adhesive, and a bolting mechanism.

14. The device of claim 9, wherein the external monitoring device further includes a controller configured to,
control an operation mode of the external monitoring device to be one of an active mode and a stand-by mode based on the external measurement data,
wherein the external monitoring device is configured to operate such that less power is used in the stand-by mode than in the active mode.

15. The device of claim 1 wherein the receiver station includes a data processing unit configured to determine conditions in the reactor core including at least one of cladding oxidation, water level, cladding melting, nuclear reactivity $k_{eff}$ and temperature, based on at least one of the external measurement data and the internal measurement data.

16. A device for monitoring a reactor core or a nuclear reactor, the device comprising:
a case made from a rigid material having a melting point higher than that of stainless steel, the case being configured to fit inside an internal tube of the reactor core;
one or more sensor arrays inside the case, at least one of the one or more sensory arrays being configured to take measurements of at least one of a temperature and a conductivity of the reactor core at each of a plurality of different vertical regions within the reactor core to generate internal measurement data; and
one or more internal data lines configured to transfer the internal measurement data to data lines of the nuclear reactor,
the one or more sensor arrays includes a conductivity sensor array including a plurality of conductivity sensors, each of the plurality of conductivity sensors extending to an outer surface of the case, each of the plurality of conductivity sensors corresponding to one of the plurality of different vertical regions within the reactor core, and
the case includes a plurality of protrusions extending outwards above each of the plurality of conductivity sensors, the plurality of protrusions configured to substantially mitigate coating of each of the plurality of conductivity sensors by molten materials.

17. The system of claim 16, wherein the case is made of at least one of tungsten, molybdenum, niobium and silicon carbide.

18. The device of claim 16, wherein the case is configured to fit inside a traversing in-core probe (TIP) tube of the reactor core.

* * * * *